United States Patent
Zhao et al.

(10) Patent No.: US 11,952,531 B1
(45) Date of Patent: Apr. 9, 2024

(54) COMPOUND GREASE COATING FOR CONTROLLED DISSOLUTION OF A DISSOLVABLE COMPONENT OF A DOWNHOLE TOOL

(71) Applicants: CNPC USA Corporation, Houston, TX (US); BEIJING HUAMEI, INC., Beijing (CN); CHINA NATIONAL PETROLEUM CORPORATION, Beijing (CN)

(72) Inventors: Lei Zhao, Houston, TX (US); Jiaxiang Ren, Houston, TX (US); Tim Dunne, Pearland, TX (US); Peng Cheng, Houston, TX (US); Huailiang Liu, Beijing (CN)

(73) Assignees: CNPC USA Corporation, Houston, TX (US); Beijing Huamel, Inc., Beijing (CN); China National Petroleum Corporation, Beijing (CN)

( * ) Notice: Subject to any disclaimer, the term of this patent is extended or adjusted under 35 U.S.C. 154(b) by 0 days.

(21) Appl. No.: 18/045,769

(22) Filed: Oct. 11, 2022

(51) Int. Cl.
*E21B 33/12* (2006.01)
*C09K 8/40* (2006.01)
(Continued)

(52) U.S. Cl.
CPC .............. *C09K 8/40* (2013.01); *C10M 101/00* (2013.01); *C10M 105/76* (2013.01);
(Continued)

(58) Field of Classification Search
None
See application file for complete search history.

(56) References Cited

U.S. PATENT DOCUMENTS

| 5,425,424 A * | 6/1995 | Reinhardt | E21B 34/14 166/291 |
| 6,679,526 B2 | 1/2004 | Yamamoto et al. | |

(Continued)

FOREIGN PATENT DOCUMENTS

RU 58059 U1 11/2006

OTHER PUBLICATIONS

"NLGI consistency number"; Wikipedia; accessed Aug. 31, 2023; <https://en.wikipedia.org/wiki/NLGI_consistency_number>. (Year : 2023).*

*Primary Examiner* — Andrew Sue-Ako
(74) *Attorney, Agent, or Firm* — Craft Chu PLLC; Andrew W. Chu

(57) ABSTRACT

A coating protects a dissolvable component of a downhole tool, so that the dissolvable component can be deployed to a desired downhole location, perform under high stress for fracturing operations, and be efficiently dissolved after the fracturing operations are completed. The present invention elevates known greases for this functionality usually performed by complex factory fabricated polymer and metal coatings. The coating includes an activation layer, a first grease layer, and a second grease layer. The first grease layer and the second grease layer have differential grease layer consistency ranges and thickness rages. The coating includes non-uniform layers of manually applied greases onsite to control degradation of the component substrate as effectively as factory coatings pre-fabricated on the components.

5 Claims, 2 Drawing Sheets

| Figure | First grease layer thickness (microns) | First grease layer consistency (NLGI) | Second grease layer thickness (microns) | Second grease layer consistency (NLGI) | 6-24 hour protection |
|---|---|---|---|---|---|
| 2a | 100-1000 | 200-270 | None | None | NO |
| 2b | None | None | 500-2000 | 280-320 | NO |
| 2c | 150 | 263 | 2000 | 285 | YES |
| 3a | 150 | 263 | 400 | 285 | NO |
| 3b | 150 | 263 | 2000 | 285 | YES |
| 3c | 2000 | 263 | 2000 | 285 | NO |

(51) Int. Cl.
  *C10M 101/00* (2006.01)
  *C10M 105/76* (2006.01)
  *C10M 107/00* (2006.01)
  *E21B 33/134* (2006.01)

(52) U.S. Cl.
  CPC ........... *C10M 107/00* (2013.01); *E21B 33/12* (2013.01); *E21B 33/134* (2013.01)

(56) References Cited

U.S. PATENT DOCUMENTS

| | | |
|---|---|---|
| 7,770,935 B2 | 8/2010 | Imai et al. |
| 7,842,403 B2 | 11/2010 | Meyer, Jr. et al. |
| 7,955,694 B2 | 6/2011 | Hazel et al. |
| 8,276,946 B2 | 10/2012 | Kimoto et al. |
| 9,752,710 B2 | 9/2017 | Goto et al. |
| 2011/0048809 A1* | 3/2011 | Duckworth ............. E21B 10/18 508/136 |
| 2011/0084477 A1 | 4/2011 | Mallis et al. |

\* cited by examiner

| Figure | First grease layer thickness (microns) | First grease layer consistency (NLGI) | Second grease layer thickness (microns) | Second grease layer consistency (NLGI) | 6-24 hour protection |
|---|---|---|---|---|---|
| 2a | 100-1000 | 200-270 | None | None | NO |
| 2b | None | None | 500-2000 | 280-320 | NO |
| 2c | 150 | 263 | 2000 | 285 | YES |
| 3a | 150 | 263 | 400 | 285 | NO |
| 3b | 150 | 263 | 2000 | 285 | YES |
| 3c | 2000 | 263 | 2000 | 285 | NO |

300
COMPOUND GREASE COATING FOR CONTROLLED DISSOLUTION OF A DISSOLVABLE COMPONENT OF A DOWNHOLE TOOL

CROSS-REFERENCE TO RELATED APPLICATIONS

See Application Data Sheet.

STATEMENT REGARDING FEDERALLY SPONSORED RESEARCH OR DEVELOPMENT

Not applicable.

The Names of Parties to a Joint Research Agreement

Not applicable.

Incorporation-by-Reference of Material Submitted on a Compact Disc or as a Text File Via the Office Electronic Filing System (Efs-Web)

Not applicable.

Statement Regarding Prior Disclosures by the Inventor or a Joint Inventor

Not applicable.

BACKGROUND OF THE INVENTION

1. Field of the Invention

The present invention relates to a material composition in the oil and gas industry. More particularly, the present invention relates to a grease coating for a downhole tool formed of at least one dissolvable component. Even more particularly, the present invention relates to a compound grease coating for dissolvable metal substrate of a plug.

2. Description of Related Art Including Information Disclosed Under 37 CFR 1.97 and 37 CFR 1.98

A plug is a downhole tool used in oil and gas operations. Non-conventional oil and gas production has replaced millable composite plugs with dissolvable plugs in downhole operations, like fracturing operations. After the fracturing, the dissolvable plug is dissolved in the downhole fluids. The dissolvable plug includes a plug formed with all dissolvable components or plug formed with at least one dissolvable component to collapse and release the plug from set position in the borehole. The dissolvable components may be a dissolvable metal or degradable polymer. Milling to remove a composite plug is no longer required. Therefore, the operation time and costs of milling are saved.

Dissolvable plugs conventionally made of dissolvable magnesium alloy technology has contributed significantly to the "Shale Revolution" in oil and gas industry. These dissolvable plugs temporarily block the wellbore, during a hydraulic fracturing operation, and quickly "disappear" afterwards via dissolving in produced fluids in the wellbore. During operation, degradable plugs are required to maintain mechanical integrity under high stress, during the hydraulic fracturing operation. After the hydraulic fracturing operation, the dissolvable plug needs to be removed rapidly without leaving large solid residual material in order to put the well into actual production quickly. Importantly, it is necessary to prevent downhole oil and hydraulic fracturing proppants from "wrapping" the dissolvable magnesium alloy of the dissolvable plug, which isolates the dissolvable magnesium alloy from contacting waterborne downhole fluids. This "wrapping" is reported to isolate the dissolvable magnesium alloy from water and stop the dissolving process of the dissolvable magnesium alloy completely, leading to partial or permanent blocking of wells. There is the requirement that demands the dissolvable magnesium alloy to have a lower dissolving rate so that plugs can maintain reliable strength during operation, and there is also the requirement that relies on the dissolvable magnesium alloy having a dissolving rate as high as possible, after the hydraulic fracturing operation. Conflicting requirements lead to two broadly observed field failure types, either "premature" disintegration or not dissolving at all at the end. To address this issue, there are known coatings, including delayed surface coatings or "temporary" coatings, such as a polymer spray coating.

Additionally, the dissolving rate of the dissolvable magnesium alloy is highly sensitive to downhole conditions, including well temperature and downhole fluid salinity. Due to more tight environmental regulations and lack of freshwater resources, operators are required to use flow-back water and produced water to perform the hydraulic fracturing operation. The salinity of these allowed fluids fluctuates significantly from well to well, even for a single well at different phases. Therefore, each well, even each hydraulic fracturing operation in a well, might require specific plugs made of specific grades of the dissolvable magnesium alloy as well as respective compatible polymer coatings. Supplying the number of different plugs and corresponding different coatings for a single will is a difficult and expensive challenge for both plug manufacturer and well operators.

The current challenges in the oil and gas industry are the control of dissolving dissolvable components and the supply of all of the different coatings for a single well. The dissolvable component must not dissolve or degrade too early during deployment and during operation. The dissolvable component must retain the ability to dissolve as fast and efficiently as possible for removal. Coatings are developed to prevent dissolving or degradation until needed. Fluoropolymer coatings of resins and fluoropolymer lubricants provide resistance to corrosion during deployment, and these coatings degrade so that the component can be triggered for the quick dissolve during removal of the tool. Electroless nickel coatings are also known. The electroless nickel coating requires its own trigger to degrade before the dissolvable metal alloy of the component substrate. Grease coatings are also known. A grease coating includes a base lubricant, thickener, and additives. Different coatings can also be combined in layers to form compound coatings so that properties of each layer are triggered in a pre-set sequence.

Various patents and publications are available in the field of coatings with multiple layers. The selection of composition for each layer is intentional for desirable physical characteristics. The irregularities and pores in the transitions between layers are known for synergistic effects. A less viscous layer is washed away quickly, but the transition layer with irregularities and pores between the less viscous layer and the more viscous layer lasts longer than the less viscous layer. The less viscous composition has last longer than expected. See U.S. Pat. No. 7,770,935, issued on 10 Aug. 2010 to Imai et al, U.S. Pat. No. 6,679,526, issued on 20 Jan. 2004 to Yamamoto et al, US Publication No.

2011/0084477 published on 14 Apr. 2011 for Mallis et al, U.S. Pat. No. 9,752,710, issued on 5 Sep. 2017 to Goto et al, U.S. Pat. No. 8,276,946, issued on 2 Oct. 2012 to Kimoto et al, and U.S. Pat. No. 7,842,403, issued on 30 Nov. 2010 to Meyer Jr. et al. There are inherent differences between layers by virtue of different material compositions of each layer.

U.S. Pat. No. 7,955,694, issued on 7 Jun. 2011 to Hazel et al, describes temporary top layer to wash away but fill pores in a lower layer with the longer lasting protective function. Russian Patent No. RU58059, issued on 10 Nov. 2006 to Astafiev et al, discloses multiple layers in a coating based on different relative hardness and thickness.

The prior art coating compositions in the oil and gas industry remain intact for short amounts of time. However, there are operations that require more than eight hours for conveyance period in the wellbore. There can be extended conveyance periods and extended wait time at the downhole location within the wellbore as well. Additionally, the component as the dissolvable material must remain reactive to the prior art trigger to dissolve the component. A plug or other component may need to wait for over thirty days before being activated. A coating must protect the potency of the material composition of the dissolvable component to dissolve. The shorter duration of less than four hours will not protect against early exposures to degrade the dissolvable component, such that the potency of the dissolvability is not protected over the longer conveyance periods and extended wait times. These longer conveyance periods and extended wait times are not compatible with the prior art coatings for downhole tools. A different coating composition is needed.

Additionally, the known polymer coatings, including fluoropolymer coatings, and electroless nickel coating, and compound coatings that contain polymer or electroless nickel, must be pre-fabricated. These coatings require equipment and materials for curing or plating that cannot be performed onsite at the wellbore location. The coated dissolvable metal alloy components must be fabricated in a professional painting or manufacturing plant with the proper equipment, supplies and safety compliance. There is only a select inventory to be available at a manufacturing plant and a further restricted inventory available onsite at the wellbore location. Furthermore, the pre-fabrication of known coatings and known compound coatings do not allow for adjustment and modification onsite. The set of different dissolvable magnesium alloy and respective coatings must be pre-ordered. Even if the type of dissolvable magnesium alloy is correct, the corresponding coating may not be correct. Additionally, the transport of coated dissolvable magnesium alloy incurs additional risk of damage to the coating. One scratch can be fatal to early disintegration of the plug or at least a portion of the plug that creates a structural weakness. That structural weakness may prevent the hydraulic fracturing operation from being able to be performed.

It is an object of the present invention to provide a compound coating that prevents corrosion of a dissolvable component in wellbore conditions during deployment between 6-24 hours.

It is an object of the present invention to provide a compound coating that preserves the potency of the dissolvable component to degrade in wellbore conditions during operation.

It is an object of the present invention to provide a compound coating of a dissolvable component that has a controlled degradation to expose the dissolvable component.

It is another object of the present invention to provide a compound coating of a dissolvable component that has a degradation according to thickness and differential consistency, that is, National Lubricating Grease Institute (NLGI) consistency, between layers.

It is another object of the present invention to provide a compound grease coating for onsite application.

It is still another object of the present invention to provide a compound grease coating with non-uniform bonding between layers consistent with onsite application.

It is still another object of the present invention to provide a compound grease coating interchangeable with different dissolvable substrates of a downhole tool.

These and other objectives and advantages of the present invention will become apparent from a reading of the attached specification.

BRIEF SUMMARY OF THE INVENTION

Embodiments of the coating of the present invention protect a dissolvable component of a downhole tool during the conveyance period and wait time in a wellbore. The coating covers a dissolvable downhole tool component. The coating comprises an activation layer, a first grease layer, and a second grease layer. The coating of the present invention is a compound coating that elevates known greases to a functionality on par with polymer and electroless nickel coatings. The present invention further allows the non-uniform layers of manually applied greases onsite to control degradation of the component substrate as effectively as factory coatings pre-fabricated on the components.

The activation layer is comprised of an activation compound, that can be applied by spraying. The activation compound effectively bonds to metal of the component substrate and the grease of the first grease layer. The activation layer has an activation layer thickness with an activation layer thickness range of 10-500 µm. The activation layer is non-uniform and can have activation layer cracks and activation layer pores, due to field operators applying the activation layer 20 onsite.

The first grease layer has a first grease layer consistency range of NLGI 200-250 and a first grease layer thickness with a first grease layer thickness range of 100-1000 µm. The first grease layer is a comprised of a first lubrication base, a first thickener, and a first additive. The first lubrication base is chemically compatible with the activation compound of the activation layer. The lubrication base is also hydrophobic/water-tight to protect the metal of the component substrate from water-based downhole fluids. The first grease layer consistency range allows the first grease layer to maintain mechanical integrity even at high temperatures. The first thickener and first additive are also selected for compatibility with the first lubrication base for the strong bonding of the first grease layer with activation layer and the mechanical integrity. Importantly, embodiments of the first grease layer are bonded non-uniformly to the activation layer and are applied by personnel manually in the field. The first grease layer can have first grease layer cracks and first grease layer pores.

The second grease layer has a second grease layer consistency range of NLGI 280-320 and a second grease layer thickness with a second grease layer thickness range greater than 500 µm. The second grease layer is a comprised of a second lubrication base, a second thickener, and a second additive. The second grease layer consistency range allows the second grease layer to form a transition zone. The second thickener and second additive are also selected for compatibility with the activation layer and the second lubrication base for the formation of the transition zone. The second grease layer 50 is also bonded non-uniformly to the first grease layer and is also applied by personnel manually in the field. The second grease layer can have second grease layer cracks and second grease layer pores.

The first grease layer is between the activation layer and the second grease layer so as to form the coating as a compound coating of the present invention. There is the transition zone to maintain the compound coating between 6-24 hours in solution, which protects the component substrate from dissolving too quickly for 6-24 hours. The transition zone can include a portion of the second grease layer within the first grease layer cracks and the first grease layer pores. The lack of uniformity is still not prohibitive for second grease layer. The non-uniform second grease layer remains effective so that onsite application at the wellbore location in the field is possible.

Embodiments also include an activation transition zone. The activation transition zone is comprised of a portion of the first grease layer within the non-uniform activation layer.

Embodiment also includes the method for removing a downhole tool from a wellbore with the coating of the present invention. The method includes spraying an activation layer on a cleaned component substrate of the downhole tool onsite at a wellbore location. Uniform coverage of the component substrate is not required. The method includes applying a first grease layer over the activation layer onsite at the wellbore. The first grease layer is bonded non-uniformly to the activation layer. Then, a second grease layer is applied over the first grease layer onsite at the wellbore location. The second grease layer is also bonded non-uniformly to the first grease layer, so as to form a compound coating on the component substrate.

The method further includes forming a transition zone with the first grease layer and the second grease layer and deploying the component substrate with the compound coating to a downhole location. The compound coating protects the component substrate from dissolution for 6-24 hours. After a hydraulic fracturing operation, the method includes the step of dissolving the component substrate so as to remove the downhole tool from the wellbore.

DETAILED DESCRIPTION OF THE INVENTION

Figure 1:
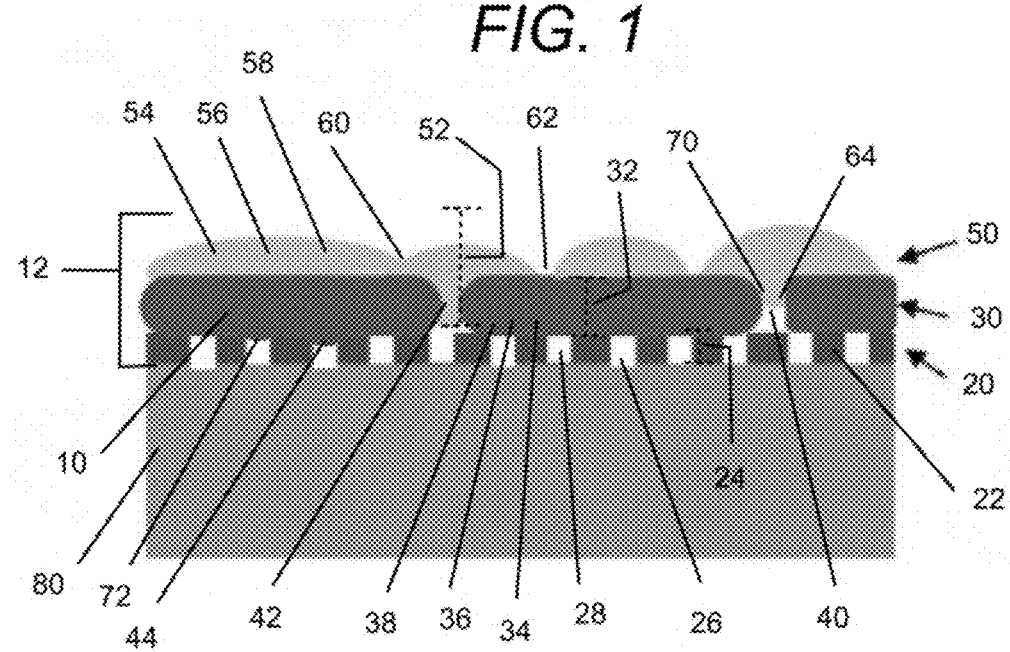
FIG. 1 is a schematic illustration of an embodiment of the coating according to the present invention.

Referring to FIGS. 1-4, the coating of the present invention protects a dissolvable component of a downhole tool during the conveyance period and wait time in a wellbore. The coating of the present invention is a compound coating that elevates known greases to a functionality on par with polymer and electroless nickel coatings. Although previously too temporary for hours of protection and too irregular for consistent application, the compound coating of the present invention is a particular synergy between two grease layers that addresses the problem of supplying a proper inventory of dissolvable plugs with corresponding coatings for the different demands of a single well. The non-uniformity of the grease layers of the present invention applied onsite are no longer a prohibitive liability. The thickness and consistency ranges of the two grease layers transform the non-uniformity of onsite grease application into a reliable and cost effective solution for supplying a properly expansive inventory of dissolvable plugs for any well.

In the present invention, the coating 10 covers a dissolvable downhole tool component. The coating 10 comprises an activation layer 20, a first grease layer 30, and a second grease layer 50. More particularly, the coating 10 covers a component substrate 80, which can be a dissolvable metal substrate, including dissolvable magnesium alloy. The coverage of the dissolvable metal substrate is non-uniform. The activation layer 20 is between the component substrate 80 and the first grease layer 80.

Embodiments of the activation layer 20 are comprised of an activation compound 22. Due to low polarity, grease does not adhere well to metal surfaces, leading to problems, such as poor wetting and low mechanical integrity. After cleaning of a metal surface, such as the dissolvable metal substrate of the component substrate 80, the activation layer 20 is applied. The activation layer 20 can be applied by spraying. The activation compound 22 is chosen for both effective bonding to metal of the component substrate 80 and the grease of the first grease layer 30. The activation compound 22 can be silicone, epoxy, polyacrylic, or another suitable composition. The activation layer 20 is bonded to the first grease layer 30 and able to be bonded to the component substrate 80. The activation compound 22 can be is stored in a small pressured can so as to be highly portable and easy to use by field personnel onsite at the wellbore location.

As shown in FIG. 1, this activation layer 20 has an activation layer thickness 24 with an activation layer thickness range of 10-500 μm. The activation layer 20 is non-uniform and can have activation layer cracks 26 and activation layer pores 28, due to field operators applying the activation layer 20 onsite.

Embodiments of the first grease layer 30 have a first grease layer consistency range of NLGI 200-250 and a first grease layer thickness 32 with a first grease layer thickness range of 100-1000 μm. The first grease layer 30 is a comprised of a first lubrication base 34, a first thickener 36, and a first additive 38. The first lubrication base 34 is chemically compatible with the activation compound 22 of the activation layer 20, i.e., the lubrication base 34 and the activation compound 22 have a similar chemistry. The lubrication base 34 is also hydrophobic/water-tight to protect the metal of the component substrate 80 from water-based downhole fluids. The lubrication base 34 is also chosen to be thermally and chemically stable in downhole conditions up to 175 degrees C. and above. The first lubrication base 34 can be silicone, including fluorosilicone, synthetic oil, and petroleum oil, including polyaphaolefin and polyolester. In some embodiments, the first grease layer thickness range is 100-300 μm.

The first grease layer consistency range allows the first grease layer 30 to maintain mechanical integrity even at high temperatures. The first thickener 36 and first additive 38 are also selected for compatibility with the first lubrication base 34 for the strong bonding of the first grease layer 30 with activation layer 20 and the mechanical integrity. The first grease layer or harder grease layer can survive strong downhole fluid turbulence during deployment downhole for plug setting and during hydraulic fracturing operations. Importantly, embodiments of the first grease layer 30 are bonded non-uniformly to the activation layer 20. The first grease layer 30 applied by personnel manually in the field. The first grease layer 30 can have first grease layer cracks 40 and first grease layer pores 42, as shown in FIG. 1.

Embodiments of the second grease layer 50 have a second grease layer consistency range of NLGI 280-320 and a second grease layer thickness 52 with a second grease layer thickness range greater than 500 µm. The second grease layer 50 is a comprised of a second lubrication base 54, a second thickener 56, and a second additive 58. The second grease layer consistency range allows the second grease layer 50 to form a transition zone 70. The second thickener 56 and second additive 58 are also selected for compatibility with the activation layer 20 and the second lubrication base 54 for the formation of the transition zone 70. The second grease layer or softer grease layer infiltrates the non-uniform first grease layer 30 efficiently. The second lubrication base 54 can be silicone, synthetic oil, and petroleum oil. In some embodiments, the second grease layer thickness range is 500-2000 µm.

The second grease layer 50 is bonded non-uniformly to the first grease layer 30. The second grease layer 50 is also applied by personnel manually in the field. The second grease layer 50 can have second grease layer cracks 60 and second grease layer pores 62.

Figures 3A, 3B, 3C, 4:
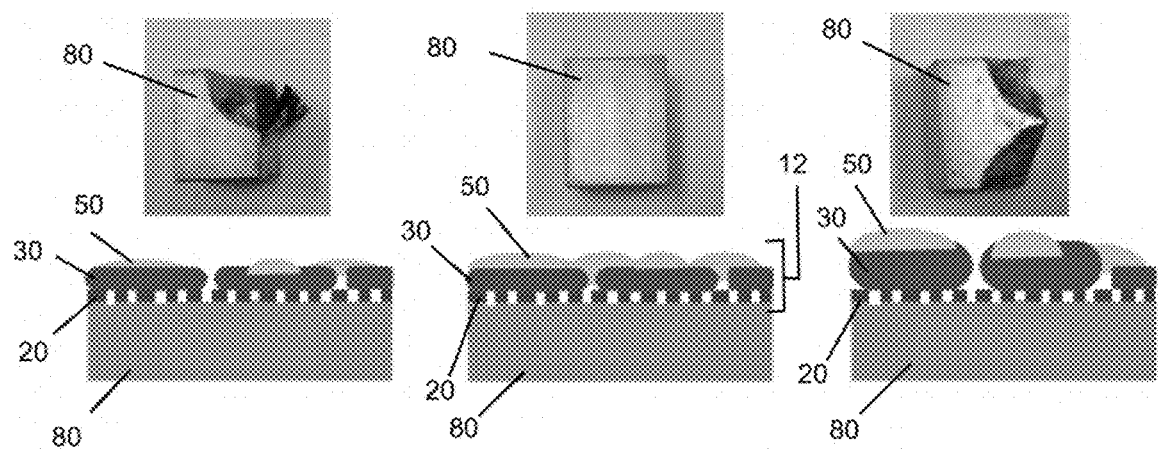
FIG. 3a is a photographic illustration and schematic view of a coating with a second grease layer thickness outside of the present invention, showing early disintegration.
FIG. 3b is a photographic illustration and schematic view of the coating, showing protection of the dissolvable substrate after six hours, according to the present invention.
FIG. 3c is a photographic illustration and schematic view of a coating with a first grease layer thickness outside of the present invention, showing early disintegration.
FIG. 4 is a chart illustration of prior art coatings and embodiments of the coatings of the present invention.

As shown in FIG. 1, the first grease layer 30 is between the activation layer 20 and the second grease layer 50 so as to form the coating 10 as a compound coating 12 of the present invention. The first grease layer 30 and the second grease layer 50 form a transition zone 70 so as to maintain the compound coating between 6-24 hours in solution, which protects the component substrate 80 from dissolving too quickly for 6-24 hours. The transition zone 70 is comprised of a portion 64 of the second grease layer 30 within the first grease layer cracks 40 and the first grease layer pores 42, as shown in FIGS. 4 and 3b. Due to the second grease layer consistency range or lower viscosity, the second grease layer more efficiently infiltrates and blocks the first grease layer cracks 40 and the first grease layer pores 42. Although most of the second grease layer or "softer" grease can be relatively easily rinsed away by strong downhole current, during deployment, the transition zone 70 remains with the portion 64 of the second grease layer 30. There is no apparent upper limit to the second grease layer thickness, because the second grease layer consistency range allows even excessive amounts of the second grease layer 50 to be wiped away easily. In the present invention, the second grease layer thickness is relative to the first grease layer thickness in order to form the transition zone 70 to protect the component substrate 80 for 6-24 hours. Again, the lack of uniformity is still not prohibitive for second grease layer 50. The non-uniform second grease layer 50 remains effective so that onsite application at the wellbore location in the field is possible.

In some embodiments of FIGS. 1 and 3b, the activation layer 20 and the first grease layer 30 form an activation transition zone 72. The activation transition zone is comprised of a portion 44 of the first grease layer 30 within the activation layer cracks 26 and the activation layer pores 28. The activation layer 20 by spraying no longer must be uniform either. As such, the compound coating 12 can be comprised of the activation layer 20, the activation transition zone 72, the first grease layer 30, the transition zone 70, and the second grease layer 50 of FIG. 1.

The present invention includes the embodiment of a method for removing a downhole tool from a wellbore. The method includes spraying an activation layer 20 on a component substrate 80 of the downhole tool onsite at a wellbore location. There can also be a step of cleaning the component substrate 80, especially when the component substrate 80 is a dissolvable metal substrate. In the field, the activation layer thickness range is 10-500 µm, and uniform coverage of the component substrate 80 is not required. The next step is applying a first grease layer 30 over the activation layer onsite at the wellbore. The first grease layer 30 is bonded non-uniformly to the activation layer 20. The next step of the method is applying a second grease layer 50 over the first grease layer onsite at the wellbore location. The second grease layer 50 is bonded non-uniformly to the first grease layer 30, so as to form a compound coating 12 on the component substrate 80.

Embodiments of the method of the present invention include forming a transition zone 70 with the first grease layer 30 and the second grease layer 50; deploying the component substrate 80 with the compound coating 12 to a downhole location; and protecting the component substrate 80 from dissolution with the compound coating 12 on the component substrate 80 for 6-24 hours. The first grease layer has a first grease layer consistency range of NLGI 200-250 and a first grease layer thickness with a first grease layer thickness range of 100-1000 µm. The second grease layer has a second grease layer consistency range of NLGI 280-320 and a second grease layer thickness with a second grease layer thickness range greater than 500 µm. After the hydraulic fracturing operation, the method includes the step of dissolving the component substrate 80 so as to remove the downhole tool from the wellbore.

Figures 2A, 2B, 2C:
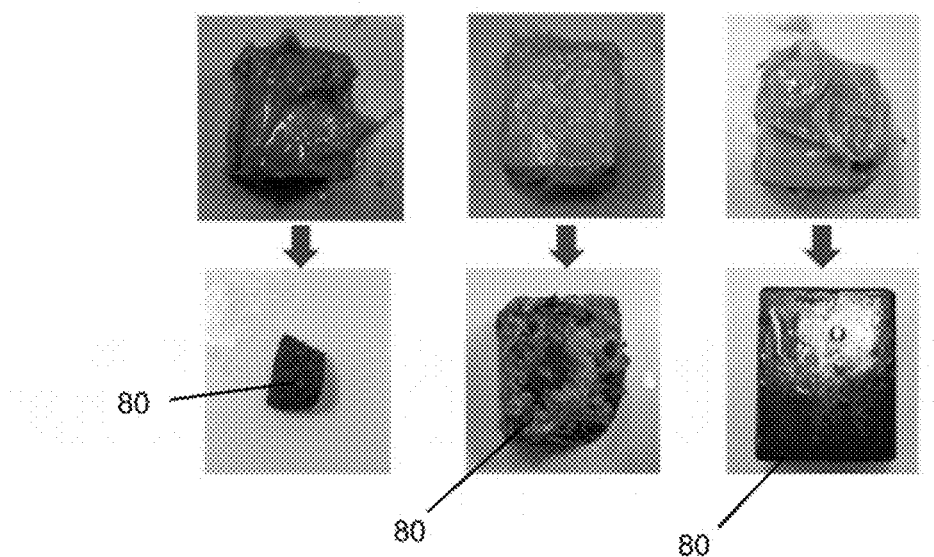
FIG. 2a is a photographic illustration of a coating of the second grease layer only, showing early disintegration.
FIG. 2b is a photographic illustration of a coating of the first grease layer only, showing early disintegration.
FIG. 2c is a photographic illustration of an embodiment of the coating, showing protection of the dissolvable substrate after six hours, according to the present invention.

FIGS. 1, 2c, and 3b show an embodiment of the method of the present invention, including the first grease layer being comprised of first grease layer cracks 40 and first grease layer pores 42, and the transition zone 70 being comprised of a portion 64 of the second grease layer within the first grease layer cracks 40 and the first grease layer pores 42. In these embodiments, the first grease layer thickness range is 100-300 µm, and the second grease layer thickness range is 500-2000 µm. The component substrate 80 is comprised of a dissolvable metal substrate so that the step of protecting the component substrate 80 from dissolving with the compound coating 12 on the component substrate 80 for 6-24 hours, comprises the step of removing at least a portion 14 of the compound coating 12 from the component substrate 80. The second grease layer 50, the first grease layer 30, and the activation layer 20 are non-uniform. Despite this lack of uniformity, FIGS. 2c and 3b still show the step of protecting. In some embodiments, the step of removing at least a portion of the compound coating is comprised of removing at least a portion of the second grease layer 50 before removing at least a portion of the activation layer 20. Alternatively, the step of removing at least a portion of the compound coating is comprised of removing at least a portion of the transition zone 70 before removing at least a portion of the activation layer 20.

A further embodiment of the method of the present invention includes the activation layer 20 being non-uniform and having activation layer cracks 26 and activation layer pores 28. With the component substrate 80 being comprised of a dissolvable metal substrate, the method further comprising the step of forming an activation transition zone 72, after the step of applying the first grease layer 30 over the activation layer 20 onsite at the wellbore. The activation transition zone 72 is comprised of a portion 44 of the first grease layer 30 within the activation layer cracks 26 and the activation layer pores 28. As part of the compound coating 12, at least a portion of the activation transition zone 72 can be removed during the step of protecting the component substrate 80.

FIG. 4 further summarizes the coating 10 and method of the present invention. The data from FIGS. 2a and 2b support the synergistic effects of FIG. 2c. In FIGS. 2a, 2b and 2c, the component substrate is a dissolvable magnesium alloy that normally dissolves completely within 2 hours at 140 degrees C. in 3% KCL solution. FIG. 2a shows the second grease layer or softer grease layer alone, and the result show that the component substrate was not protected after 6 hours. FIG. 2b shows the first grease layer or harder grease layer alone, and the result show that the component substrate was not protected after 6 hours. FIG. 2c shows the coating 10 of the present invention. The component substrate is intact after 6 hours at 140 degrees C. in 3% KCl solution. In isolation, the grease is not suitable protection, but in the compound coating of the present invention, the particular combination of a specific differential greases are suitable.

The synergy itself is not the present invention, since synergy between two different layers is known in much of the prior art with even more complex multiple layers and interactions. FIGS. 3a, 3b, and 3c show the criticality of the present invention because the synergy can be lost. It is not inherent for any two different greases to be able to perform. It is not normal experimentation that can render any two different greases to protect the component substrate for 6-24 hours. For the first grease layer with a first grease layer consistency range of NLGI 200-270 and the second grease layer with second grease layer consistency range of NLGI 280-320, FIG. 3a shows the failure of the first grease layer and the second grease layer. There is a loss of mass over 5% in the component substrate after 6 hours at 140 degrees C. in 3% KCl solution. There is insufficient second grease layer thickness for the first grease layer thickness. FIG. 3c shows another failure of the first grease layer and the second grease layer. There is a loss of mass about 10.3% in the component substrate after 6 hours at 140 degrees C. in 3% KCl solution. Increase the second grease layer or softer grease cannot overcome the problem itself. There is an interaction with the first grease layer thickness for the particular first grease layer consistency range of NLGI 200-270 and the second grease layer with second grease layer consistency range of NLGI 280-320. FIG. 3b shows the criticality of the first grease layer thickness range between 100-1000 µm and the second grease layer thickness range between 500-2000 µm for the particular first grease layer consistency range of NLGI 200-270 and the second grease layer with second grease layer consistency range of NLGI 280-320.

The present invention provides a compound coating that protects the dissolvable component during deployment and while waiting for a hydraulic fracturing operation. The target remains 6-24 hours, which is consistent with the desire performance standards of prior art coatings for the purpose of controlling dissolution of dissolvable components, namely components of a plug or other downhole tool comprised of a dissolvable magnesium alloy. The present invention elevates greases, which were conventionally unable to achieve the performance standards of polymer and electroless nickel coatings. Individual greases were too temporary and cannot last under downhole conditions.

Greases were also not considered for effective degradation control of dissolvable components because of non-uniform layers. In particular for field operators onsite at the wellbore location, there is no even or smooth application of grease. There is no consistency, and the grease layers have cracks and pores that normally prohibit consistent and reliable protection of a dissolvable component. The present invention further elevates onsite application of grease layers. The non-uniform bonding between layers consistent with onsite application become a functional advantage for a particular synergy when there is particular differential thickness and differential consistency, that is, National Lubricating Grease Institute (NLGI) consistency, between layers.

There is a tremendous benefit of the present invention as non-uniform onsite application of previously unsuitable greases enable operators to supply full inventories of different dissolvable components for a multiple wells. Instead of sets of different dissolvable components with different coatings for a single well, the present invention enables any set of different dissolvable components to have adjustable coatings per well requirements onsite at the wellbore location. The first grease layer and the second grease layer of the present invention can be applied to any of the set of different dissolvable components. There is no longer a need to pre-order extensive sets of factory coated dissolvable components. The present invention now allows dissolvable components to be coated onsite as needed, as opposed to speculating that a factory coated dissolvable component will be needed or a particular number of factory coated dissolvable components will be needed.

The foregoing disclosure and description of the invention is illustrative and explanatory thereof. Various changes in the details of the illustrated structures, construction and method can be made without departing from the true spirit of the invention.

The invention claimed is:
1. A method for removing a downhole tool from a wellbore, the method comprising the steps of:
spraying an activation layer on a component substrate of the downhole tool onsite at a wellbore location, said activation layer being comprised of an activation compound and having an activation layer thickness with an activation layer thickness range of 10-500 µm, wherein said activation compound comprises silicones, epoxy or acrylic;
applying a first grease layer over said activation layer onsite at said wellbore, said first grease layer having a first grease layer consistency range of NLGI 200-270 and a first grease layer thickness with a first grease layer thickness range of 100-1000 µm, said first grease layer being bonded non-uniformly to said activation layer;
applying a second grease layer over said first grease layer onsite at said wellbore location, said second grease layer having a second grease layer consistency range of NLGI 280-320 and a second grease layer thickness with a second grease layer thickness range that is 500-2000 µm, said second grease layer being bonded non-uniformly to said first grease layer, so as to form a compound coating on said component substrate;
forming a transition zone with said first grease layer and said second grease layer;
deploying said component substrate with said compound coating to a downhole location;

protecting said component substrate from dissolution with said compound coating on said component substrate for 6-24 hours; and dissolving said component substrate so as to remove the downhole tool from the wellbore.

2. The method, according to claim 1, wherein said first grease layer is comprised of first grease layer cracks and first grease layer pores, wherein said transition zone is comprised of a portion of said second grease layer within said first grease layer cracks and said first grease layer pores, wherein said first grease layer thickness range is 100-300 µm, wherein said component substrate is comprised of a dissolvable metal substrate, and wherein the step of protecting said component substrate from dissolving with said compound coating on said component substrate for 6-24 hours, comprises the step of:

removing at least a portion of said compound coating from said component substrate.

3. The method, according to claim 2, wherein the step of removing at least a portion of said compound coating is comprised of the step of:

removing at least a portion of said second grease layer before removing at least a portion of said activation layer.

4. The method, according to claim 3, wherein the step of removing at least a portion of said compound coating is comprised of the step of:

removing at least a portion of said transition zone before removing at least a portion of said activation layer.

5. The method, according to claim 1, wherein said activation layer is non-uniform and has activation layer cracks and activation layer pores, and wherein said component substrate is comprised of a dissolvable metal substrate, the method further comprising the step of:

forming an activation transition zone, after the step of applying said first grease layer over said activation layer onsite at said wellbore, said activation transition zone being comprised of a portion of said first grease layer within said activation layer cracks and said activation layer pores, said compound coating being comprised of said activation layer, said activation transition zone, said first grease layer, said transition zone, and said second grease layer.

* * * * *